US008528041B1

(12) United States Patent
Haney et al.

(10) Patent No.: US 8,528,041 B1
(45) Date of Patent: Sep. 3, 2013

(54) OUT-OF-BAND NETWORK SECURITY MANAGEMENT

(75) Inventors: David Wayne Haney, Kansas City, MO (US); Usman Muhammad Naim, Overland Park, KS (US); Andrew Lee Davey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 731 days.

(21) Appl. No.: 12/267,106

(22) Filed: Nov. 7, 2008

(51) Int. Cl.
*H04L 29/06* (2006.01)

(52) U.S. Cl.
USPC ............... 726/1; 726/2; 726/3; 726/4; 726/5; 726/6; 713/151; 713/152; 713/153

(58) Field of Classification Search
USPC ............................................................ 726/1
See application file for complete search history.

(56) References Cited

U.S. PATENT DOCUMENTS

| | | | | |
|---|---|---|---|---|
| 5,809,026 | A * | 9/1998 | Wong et al. | 370/445 |
| 7,054,944 | B2 * | 5/2006 | Tang et al. | 709/229 |
| 7,331,061 | B1 * | 2/2008 | Ramsey et al. | 726/23 |
| 7,644,085 | B2 * | 1/2010 | Miller et al. | 707/797 |
| 7,831,997 | B2 * | 11/2010 | Eldar et al. | 726/3 |
| 7,917,942 | B2 * | 3/2011 | Costa-Requena et al. | 726/4 |
| 2009/0049535 | A1 * | 2/2009 | Kalman et al. | 726/8 |

OTHER PUBLICATIONS

Weinsberg, Yaron, et al; Putting it on the NIC: A Case Study on application offloading to a Network Interface Card (NIC); (2006).
Curtiss-Wright Debuts Rugged Network Security Processor PMC Card; (2007).
FIPS 140-2 Security Policy 3Com 10/100 Secure NIC (3CR990B-97) & 3Com 100 Secure Fiber NIC (3CR990B-FX-97); (2004).

* cited by examiner

*Primary Examiner* — Longbit Chai

(57) ABSTRACT

A computer-implemented method, network management system, and network clients are provided for out-of-band network security management. The network management system includes routers, firewalls, and out-of-band interfaces. The out-of-band interface of the network management system transmits access control lists to network clients connected to a trusted network. The trusted network connects the routers, firewalls, and network clients. The firewalls receive access control lists from the network management system to police communications that traverse the trusted network and an untrusted network. The routers receive access control lists from the network management system to police communications that traverse the router within the trusted network. The access control lists for the routers and firewalls are transmitted over a network interface to the trusted network and are transmitted separately from the access control lists for the network clients.

19 Claims, 4 Drawing Sheets

OUT-OF-BAND NETWORK SECURITY MANAGEMENT

INTRODUCTION

Currently, conventional security management is performed by configuring a border firewall that connects a trusted network and untrusted network to deny access to the trusted network when a sender attempting to gain access to trusted network resources is not part of the trusted network. The conventional security management is generally applied to a border between the trusted networks and the untrusted network. Any incoming traffic to the trusted network or outgoing traffic to the untrusted network is checked by the conventional border firewall to ensure that traffic is authorized by the conventional security management.

The conventional border firewall manages the security for traffic that crosses the border firewall. Traffic crosses the conventional border firewall when the sender and receiver are not within the same network. In other words, traffic crosses the conventional border firewall when the sender is connected to the trusted network and the receiver is connected to the untrusted network. Also, traffic crosses the conventional border firewall when the receiver is on the trusted network and the untrusted network. The conventional border firewall ensures that traffic between the receiver and sender is authorized by the conventional security management.

The conventional border firewalls fail to manage security for traffic that occurs behind the conventional border firewall. The traffic between the trusted network elements is not checked by the conventional border firewall or managed by the conventional security management system. A compromised trusted network element may expose the trusted network to network attacks and reduce the effectiveness of the conventional border firewalls and the conventional security management system.

SUMMARY

Embodiments of the invention are defined by the claims below. Embodiments of the invention provide network security management systems and methods for, among other things, securing communications across a network and between network clients. The embodiments of the invention have several practical applications in the technical arts including preventing communication among trusted network clients based on access control lists; managing communications among trusted network clients; and providing a centralized management system that controls trusted network clients and other network elements.

In a first embodiment, a network management system to manage network security is provided. The network management system includes a router, a firewall, and an out-of-band interface. The router is configured to connect to a trusted network and to receive, from the network management system, access control lists for communications that traverse the router. The firewall is configured to connect a trusted network and an untrusted network and to receive, from the network management system, access control lists for communications that traverse the untrusted network and the trusted network. The out-of-band interface is part of the network management system and is configured to transmit access control lists to network clients connected to the trusted network.

In a second embodiment, a computer-implemented method to manage network security is provided. The computer-implemented method is executed by a network management system to secure communications in the telecommunication network. The network management system generates access control lists for firewalls, routers, and network clients connected to the telecommunication network. In turn, the network management system transmits the access control lists to the routers and firewalls over the telecommunication network. Also, the network management system transmits the access control lists to the network clients over an out-of-band interface that is separate from an interface to the telecommunication network, which includes a trusted network and an untrusted network.

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide network security management systems and computer-implemented methods for securing communications across a telecommunication network. The telecommunication network includes network clients that are configured to communicate with each other. In an embodiment, each network client is configured with logical packet filters. The logical packet filters at each network client is managed by a network security management system using an out-of-band interface. The out-of-band interface allows the network security management system to communicate access control rules directly to the network clients without having to traverse the telecommunication network. The administrators of the telecommunication network may configure access control lists for each network client to prevent the network clients from communicating with unauthorized network clients or network resources. The access control lists allow the network clients to communicate to other network clients or network resources based on the functions that the network clients are executing and the authorizations granted to the network clients by the administrator. The access control lists provide granular security to prevent comprised network clients from discovering all network clients and all network resources available on the telecommunication network. In one embodiment, the out-of-band interface is an embedded internet protocol (IP) stack located on a peripheral component interconnect (PCI) card.

As one skilled in the art will appreciate, embodiments of the invention include, among other things: a method, network security management system, a network client, and a computer-program product. Accordingly, the embodiments may take the form of a hardware embodiment, a software embodiment, or an embodiment combining software and hardware. In one embodiment, the computer-program product includes computer-useable instructions embodied on one or more computer-readable media for managing network security.

Computer-readable media include both volatile and nonvolatile media, removable and nonremovable media, and contemplates media readable by a database, a switch, and various other network resources. Network switches, routers, firewalls, and related components are conventional in nature, as are means of communicating with the same. By way of example, and not limitation, computer-readable media comprise computer-storage media and communications media.

Figure 1:
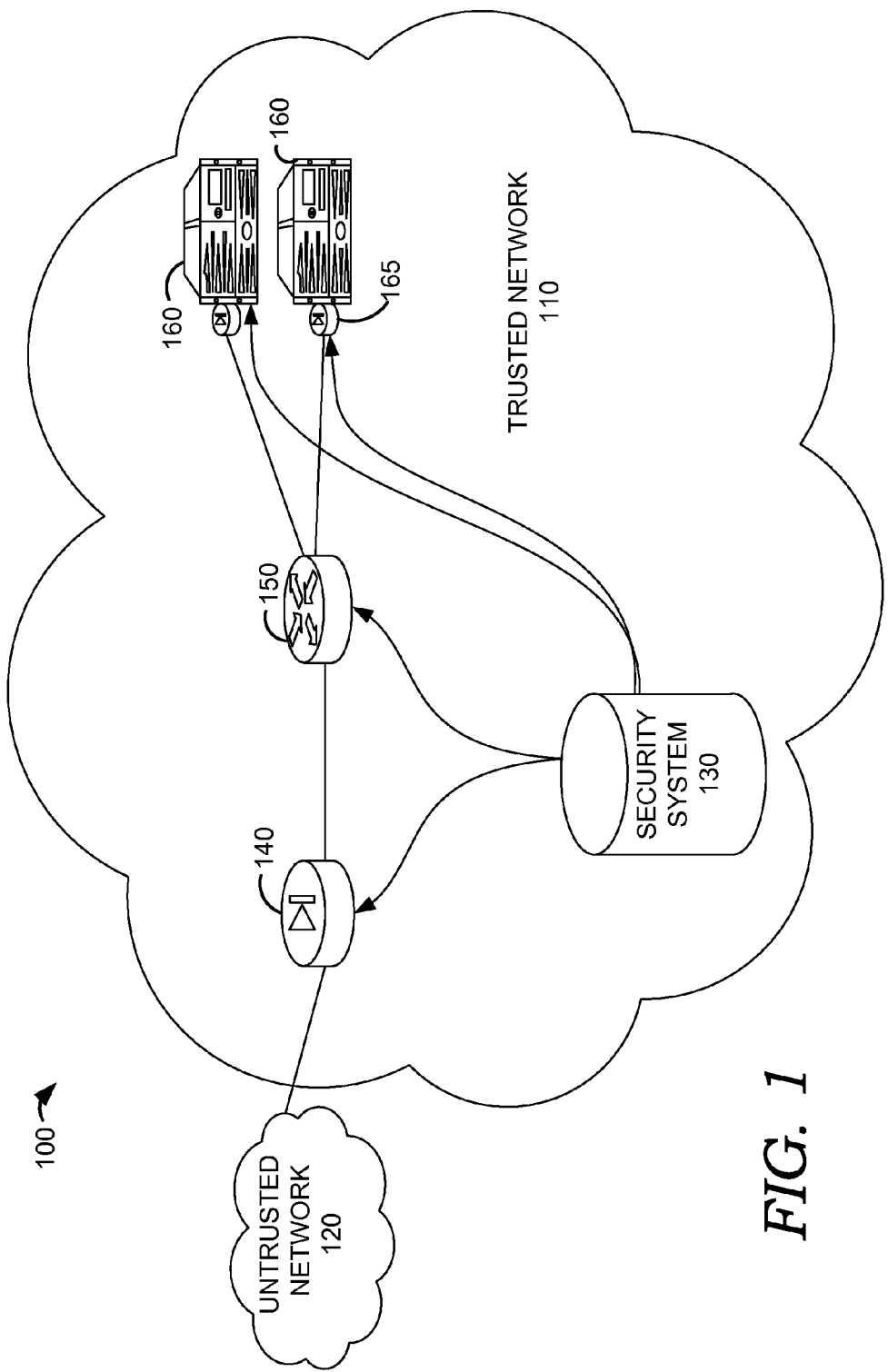
FIG. 1 is an exemplary network diagram that illustrates an out-of-band network security management system, in accordance with embodiments of the invention.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently A network security management system pushes access control lists to the network clients and network resources. The access control lists prevent unauthorized communications among the network clients connected on the telecommunication network. The access control lists at each network client enables granular control over the functions that can be performed during communications between the network clients. In some embodiments, the access control lists at each network client are configured by the network management system at one central location to increase the security of the access control lists configured by the network management system. the network resources include firewalls and routers connected to the telecommunication network FIG. 1 is an exemplary network diagram 100 that illustrates an out-of-band network security management system 130, in accordance with embodiments of the invention. A telecommunication network includes an untrusted network 120 and a trusted network 110. The untrusted network 120 is any network that is not managed by the network security management system 130. The trusted network 110 is managed by the network security management system 130.

The trusted network 110 comprises the network security management system 130, firewalls 140, routers 150, and network clients 160. The trusted network 110 may include wired networks and wireless networks. In some embodiments, the trusted network 110 may include a local area network, a wide area network, a virtual private network, or the Internet. The trusted network 110 connects firewalls 140, routers 150, and network clients 160 to the network security management system 130.

The untrusted network 120 may also include wired networks and wireless networks. In some embodiments, the untrusted network 120 may include a local area network, a wide area network, a virtual private network, or the Internet. The untrusted network 120 is not connected to the network security management system 130 and is not managed by the network security management system 130.

The network security management system 130 allows an administrator of the trusted network 110 to configure access control lists for the firewalls 140, the routers 150, and the network clients 160. The network security management system 130 is connected to the firewall 140 and the router 150 over a network interface. The network security management system 130 is connected to the network clients 160 over and out-of-band interface that is separate from the network interface. The network security management system 130 transmits the access control lists to the firewalls 140, the routers 150, and the network clients 160. The access control lists allow or disallow: communications between the trusted network 110 and the untrusted network 120; communications that traverse the firewalls 140; communications that traverse the routers 150; and communications that traverse the network clients 160.

The firewalls 140 are connected to the network security management system 130. The firewalls 140 provide border security between the trusted network 110 and the untrusted network 120. The firewalls 140 receive access control lists from the network security management system 130 over the network interface. The access control lists for the firewalls 140 include instructions on destinations or recipients that should be blocked when the communications are incoming to the trusted network 110 or communications that are outgoing from the trusted network 110.

The routers 150 are connected to the network security management system 130. The routers 150 provide additional security for communications that traverse the router. The routers 150 receive access control lists from the network security management system 130 over the network interface. The access control lists for the routers 150 include instructions on destinations or recipients that should be blocked when the communications from the network client or network resources identify the recipient or destination.

The network clients 160 are connected to the network security management system 130. The network clients 160 include computers, laptops, personal digital assistants, wireless devices or any other computing device. The network clients 160 are operated by a user to initiate communications with network clients 160 or other network resources. The network clients 160 are configured to receive access control lists over an out-of-band interface 165. In some embodiments, the access control lists received over the out-of-band interface cannot be altered by the user of the network client. The access control lists may include tamper-resistant mechanisms that prevents the network client from communicating on the trust network if the access control lists are logically or physically compromised by a user of the network client 160.

The out-of-band interface 165 is part of the network security management system 130 and the network clients 160. The out-of-band interface 165 allows the network security management system 130 to configure the access control lists on the network clients 160 without communicating across the network interface to the trusted network 110. In some embodiments, an administrator with the appropriate privileges may directly connect a laptop to the out-of-band interface 165 to configure the access control lists at the network client 160.

The network diagram 100 has been simplified to facilitate a clear description of embodiments of the invention. Alternate arrangements are within the scope and spirit of this description.

The trusted network is managed by the network security management system. The network security management system controls the communications among network clients via the access control lists configured on the network clients. Unauthorized communication between network clients are prohibited at the network client using the access control lists configured by the network security management system.

Figure 2:
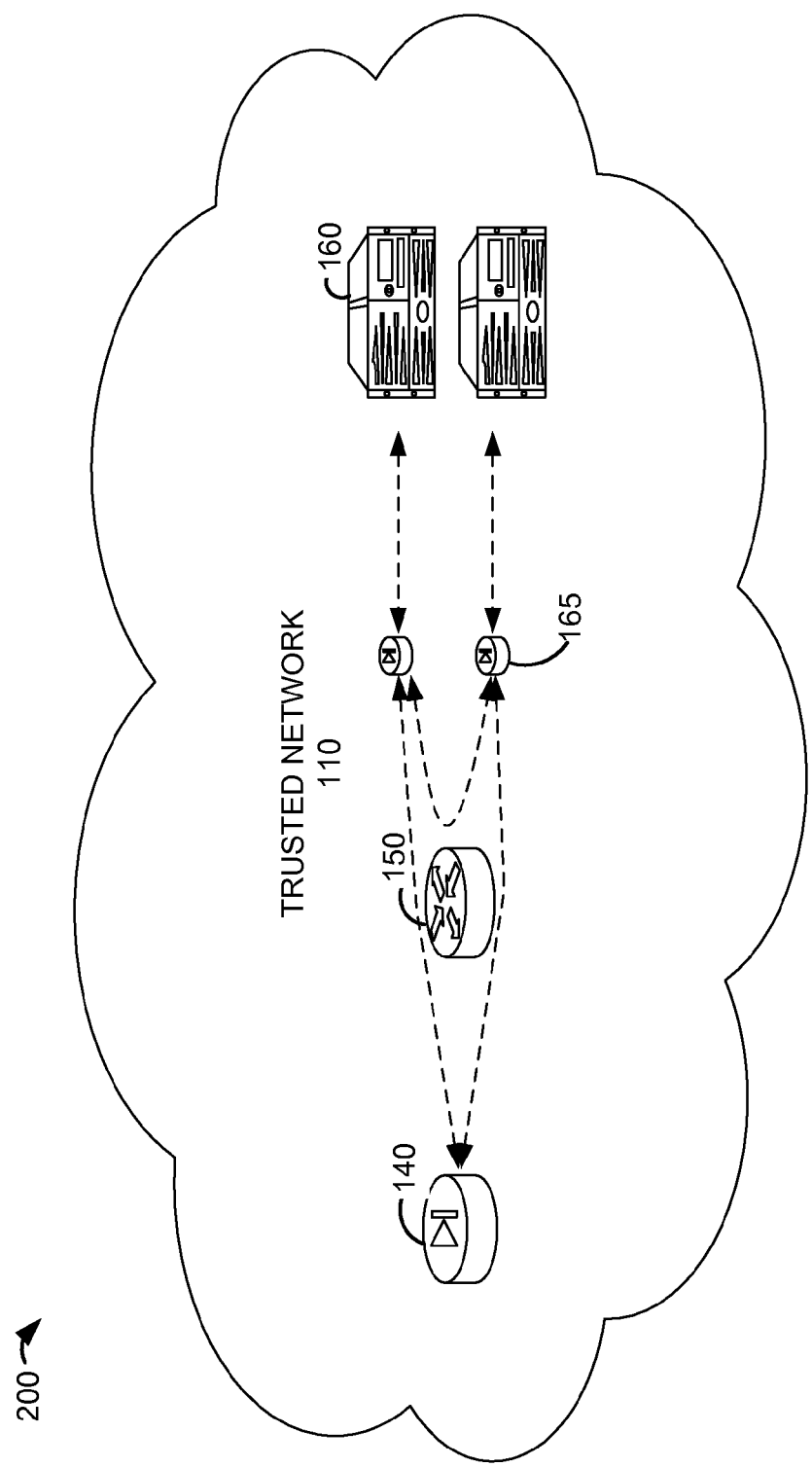
FIG. 2 is an exemplary communication diagram that illustrates communications in a trusted network, in accordance with embodiments of the invention.

FIG. 2 is an exemplary communication diagram 200 that illustrates communications in a trusted network 110, in accordance with embodiments of the invention.

The communications or request for functionality transmitted between two network clients 160 in the trusted network 110 are parsed and compared against authorizations provided by the access control lists stored at each network client 160. A successful communication session is established or functionality is provided after both network clients 160 check their corresponding access control lists to confirm that communications or functionality requested by the network client 160 is allowed. If either network client 160 denies the communication or denies the request for functionality, the communication session is dropped or functionality is denied without providing any notification of the dropped communication or denied functionality to either network client 160.

The communications or request for functionality that enter the trusted network 110 after successfully traversing the border firewall 140 are checked using the access control lists at the network clients 160 that is specified as a destination of the communications or request for functionality. The network client 160 specified as the destination receives the communications or request for functionality and checks the access control list to confirm that the communication or request for functionality is allowed. When the communication or request for functionality is allowed, the communication session with the network client 160 is continued or the functionality it provided by the network client 160. If the communication or request for functionality is denied, the communication session is dropped or functionality is denied without providing any notification of the denied communication or denied functionality to the network client 160.

Accordingly, configurable access control lists provide granular security at network clients in a trusted network. Any communication or request for functionality among the network clients traverse at least two access control lists before a communication session is allowed or the request for functionality is granted. Moreover, the access control lists at each network client is configurable from a remote network security management system to alter the privileges for each network client.

In some embodiments, the network clients are configured with an out-of-band interface that receives access control lists from the network security management system. The out-of-band interface provides a secure path for configuring the network clients. The out-of-band interface is a separate interface from the network interface that connects the clients and network security management system to the trusted network.

Figure 3:
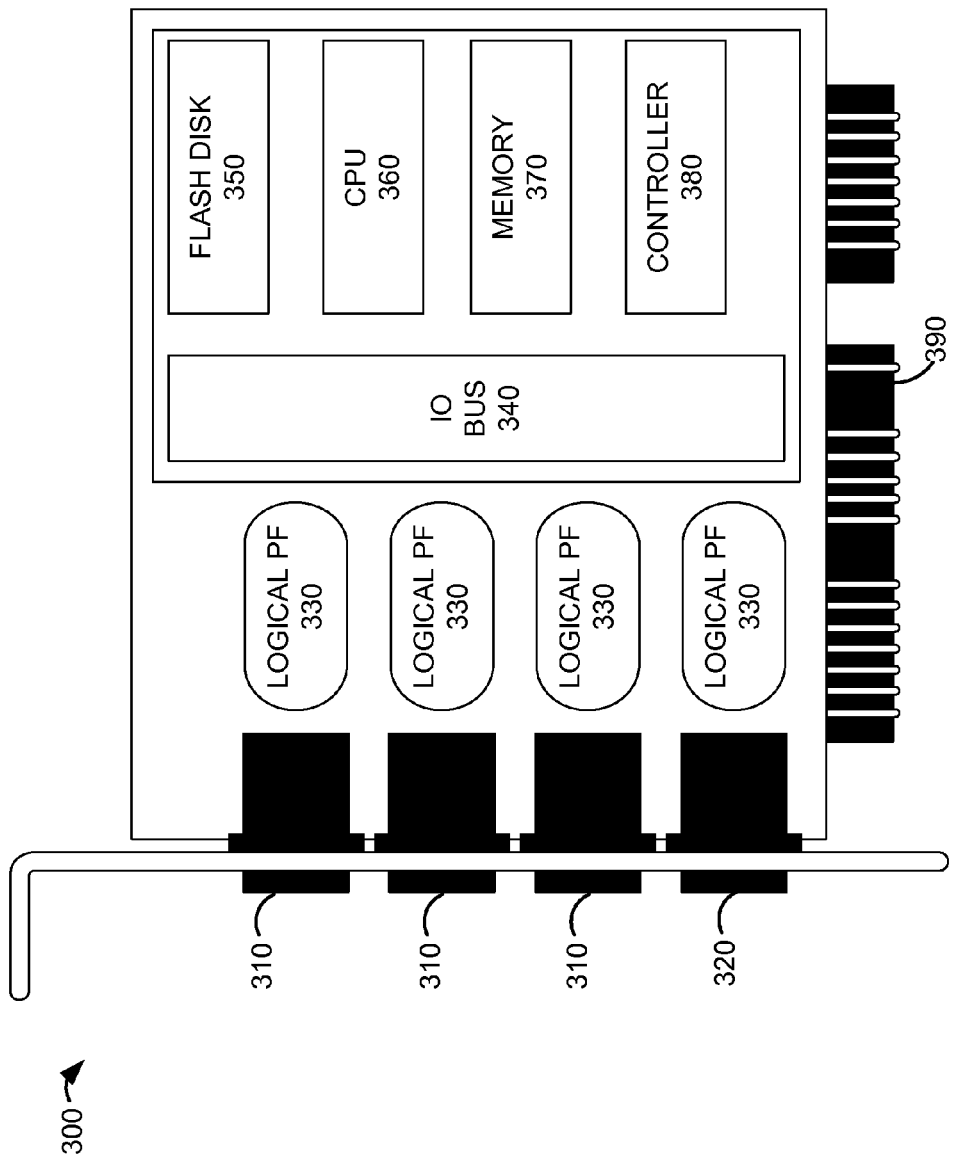
FIG. 3 is an exemplary block diagram of a network card having an out-of-band interface, in accordance with an embodiment of the invention.

FIG. 3 is an exemplary block diagram of a network card 300 having an out-of-band interface 320, in accordance with an embodiment of the invention. The out-of-band interface 320 is an interface of a network card 300 that is used by the network clients and the network security management system. The network card 300 includes network interfaces 310, an out-of-band interface 320, logical packet filters 330, input-output (IO) bus 340, flash disk 350, central processing unit (CPU) 360, memory 370, and controller 380.

In some embodiments, the network card 300 is a peripheral component interconnect (PCI) card that allows remote management of the logical packet filters 330. The logical packet filters are managed over a separate interface from the network interfaces 310 where the trusted network is connected to the network client. The separate interface is the out-of-band interface 320 and only an administrator connected to the out-of-band interface can alter the logical packet filters on the network card 300.

The network interfaces 310 connect the network client to the trusted network. The network interfaces 310 allow the network client to communicate with other network clients or network resources that are in the trusted network or the untrusted network if the communications are allowed by the access control list.

The communications generated by the network client are processed by the CPU 360 to ensure that the destinations or functionality requested by the network client is allowed by the logical packet filters 330. The CPU 360 loads the access control lists stored in the logical packet filters 330 and checks the communications or requested functionality. When the communications or requested functionality are allowed by the access control lists, the network interface 310 transmits the communication generated by the network client to the appropriate network client or network resource or requests the functionality from another network client or network resource.

The communications received by the network client are processed by the CPU 360 to ensure that the sender or functionality provided by the network client is allowed by the logical packet filters 330. The CPU 360 loads the access control lists stored in the logical packet filters 330 and checks the communications or provided functionality. When the communications or provided functionality are allowed by the access control lists, the network interface 310 continues communications with the network clients or network resources. Or the network client, over the network interface 310, provides the requested functionality to the network client or network resource that requested the functionality.

The out-of-band interface 320 is separate from the network interfaces 310. The out-of-band interface connects the network security management system to the network clients. The out-of-band interface 320 allows the network security management system that manages the firewalls and routers to manage the access control lists stored by the logical packet filters 330. The out-of-band interface 320 receives commands from the network security management system to add or remove rules in the access control lists.

The logical packet filters 330 store the access control lists that are configured by the network security management system. The logical packet filters 330 are associated with each network interface 310 and the out-of-band interface 320. The access control list stored in the logical packet filter 330 is loaded into memory and accessed by the CPU 360 to ensure that a communication or request for functionality received over the network interface 310 corresponding to the logical packet filter 330 is authorized by the network security management system. In some embodiments, the access control list for the logical packet filter 330 that corresponds to the out-of-band interface 320 may limit a number of changes the network security management system may implement for the out-of-band interface 320 or the network interfaces 310. Additionally, the logical packet filter 330 associated with the out-of-band interface 320 may include a shutdown operation that is triggered when unauthorized configuration requests are received at the out-of-band interface 320.

The IO bus 340 connects the CPU 360 to the network interfaces 310, the out-of-band interface 320, the logical packet filters 330, the flash disk 350, the memory 370, the controller 380, and the card interface 390. The IO bus 340 communicates data signals and control signals between the CPU 360 and the network interfaces 310, the out-of-band interface 320, the logical packet filters 330, the flash disk 350, the memory 370, the controller 380, and the card interface 390. The data signals and control signals on the IO bus 340 are used to configure the logical packet filters 330 based on configuration messages received over the out-of-band interface 320. Also the data signals and control signals are used to check the communications and request for functionality received over the network interfaces 310 using the corresponding logical packet filters 330.

The flash disk 350 is a permanent storage area for the network card 300. The flash disk 350 stores the drivers that are used to configure the network card 300. The drivers stored by the flash disk 350 allow the network client to connect to the network card 300. The flash disk 350 may also store data to identify the network security management system that is authorized to communicate over the out-of-band interface 320. In one embodiment, the flash disk may be a storage component that lacks moving parts.

The CPU 360 is configured to access the logical packet filters 330 to retrieve the access control lists for the network interface 310 or out-of-band interface 320. The CPU 360 checks the communications or requests for functionality received at the network interface 310 using the access control lists that correspond to the network interface 310. The CPU 360 checks that configuration messages received at the out-of-band interface 320 using the access control lists that correspond to the out-of-band interface 320. The CPU 360 denies communication or requests for functionality at the network interface 310 when the access control list indicates that that the communication or request for functionality is unauthorized. The CPU 360 also denies configuration messages at the out-of-band interface 320 when the access control list indicates that that the configuration message is unauthorized. The configuration messages alter logical packet filters 330 for the network interfaces 310 and the out-of-band interface 320.

The memory 370 is a temporary storage area for the network card 300. The memory 370 is used by the CPU 360 to store the access control lists and to load instructions that are being executed by the CPU 360. The memory 370 may also be used to store calculations performed by the CPU 360.

The controller 380 controls the network interfaces 310, the out-of-band interface 320, and the network card interface 390. The controller 380 specifies whether the network client is currently receiving communications or requests for functionality on network interfaces 310, the out-of-band interface 320, or the network card interface 390. The controller 380 is configured to disable the network interfaces 310, the out-of-band interface 320, or the network card interface 390 when the CPU 360 requests that disabling of the network interfaces 310, the out-of-band interface 320, the network card interface 390. In some embodiments, when the network security management system transmits a configuration message for the logical packet filters 330 that corresponds to a network interface 310, the controller 380 obtains the configuration message from the out-of-band interface 320 and updates the logical packet filters 330 that correspond to the network interfaces 310 based on the configuration messages received over the out-of-band interface 320.

The network card interface 390 connects the network card 300 to the network client or the network security management system. In some embodiments, the network card interface 390 is a PCI interface. The network card interface 390 allows the network client to transmit authorized communications or requests for functionality generated at the network client over the appropriate network interface 310. The network card interface 390 also allows the network client to receive authorized communications or requests for functionality that are received over the appropriate network interface 310.

Accordingly, the network card of the network client provides a configurable access control lists that allows the network security management system to control communications and requests for functionality over the out-of-band interface of the network card. In an embodiment, the network card is configured with the access control lists that are used to determine whether the communications or requests for functionality generated at the network client, or received at the network client, is authorized without having to communicate to a network resource outside of the network client. In some embodiments, the network security management system is configured with a network card similar to the network card at the network clients.

The trusted networks have network security management systems that configure the network elements and network clients to ensure that compromised network clients are unable to discover all network elements or all network clients on the trusted network. The network security management system transmits access control lists to the firewalls, routers, and network clients on the trusted network to secure the communications on the trusted network. The communications to the network clients are separate from the communications to the firewalls and the routers to provide an additional level of security on the trusted network.

Figure 4:
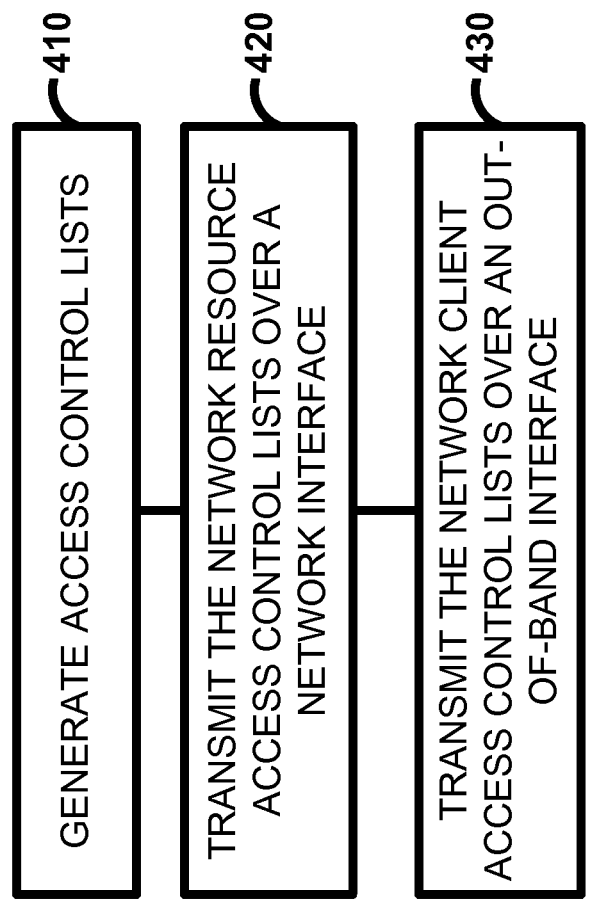
FIG. 4 is an exemplary logic diagram that illustrates a computer-implemented method for managing network security, in accordance with an embodiment of the invention.

FIG. 4 is an exemplary logic diagram that illustrates a computer-implemented method for managing network security, in accordance with an embodiment of the invention. In step 410, a network security management system generates access control lists for firewalls, routers, and network clients connected to a telecommunication network. In some embodiments, the telecommunication network comprises a trusted network and an untrusted network. The trusted network is managed by an administrator group. The routers, firewalls, and network clients are network resources that are part of the trusted network. The untrusted network is not managed by the administrator group. In turn, the network security management system transmits the access control lists to the routers and firewalls over the trusted network, in step 420. The firewalls connect the trusted network to the untrusted network. The access control lists are used to deny communication requests and to check intra-trusted network communications. In an embodiment, the communications are denied without informing a sender that the communication is denied. In step 430, the network security management system transmits the access control lists to the network clients over an out-of-band interface that is separate from an interface to the telecommunication network.

In summary, the network security management system provides granular security at the network clients via configurable access control lists that are stored at the network clients. The network clients are not allowed to configure the access control lists. When a network client on the trusted network is compromised, the communications and requests for functionality on the trusted network received by the network clients remain secure because the network card powers-off or continues checking communications or the requests for functionality, i.e., browser requests or email requests, to ensure that the network client has authorization.

Additional arrangements of the various components depicted, as well as components not shown, are possible without departing from the spirit and scope of the present invention. Embodiments of the invention are described with the intent to be illustrative rather than restrictive. It is understood that certain features and subcombinations are of utility and may be employed without reference to other features and subcombinations and are contemplated within the scope of the claims. Some steps listed in the various figures need be carried out in the specific order described.

The invention claimed is:

1. A computer-implemented method to manage network security, the computer implemented method comprising:
   generating network resource access control lists that limit access to network resources by network clients and network client access control lists that limit network client communication or functionality available at each of the network clients, wherein the network resources and the network clients are connected to a telecommunication network;
   transmitting the network resource access control lists to the network resources over the telecommunication network; and
   transmitting the network client access control lists to the network clients over an out-of-band interface that is separate from an interface to the telecommunication network, wherein the telecommunication network comprises a trusted network and an untrusted network and both of the network resource access control lists and the network client access control lists are used to check intra-trusted network communications among the network resources and the network clients that are part of the trusted network and to prevent unauthorized communications among the network clients connected on the telecommunication network.

2. The method of claim 1, wherein the network resources include routers and firewalls, and the firewalls connect the trusted network to the untrusted network.

3. The method of claim 2, wherein the trusted network is managed by an administrator group, and the administrator group is allowed to modify the network client access control list over the out-of-band interface.

4. The method of claim 3, wherein the untrusted network is not managed by the administrator group.

5. The method of claim 1, wherein the access control lists are used to deny communication requests.

6. The method of claim 5, wherein the communications are denied without informing a sender that the communication was denied.

7. A network management system to manage network security, the network management system comprising:
   a router configured to connect to a trusted network and to receive, from the network management system, access control lists for communications that traverse the router;
   a firewall configured to connect a trusted network and an untrusted network and to receive, from the network management system, access control lists for communications that traverse the untrusted network and the trusted network; and
   an out-of-band interface, being separate from an interface to the trusted network and the untrusted network, on the network management system configured to transmit network client access control lists to a network client connected to the trusted network, wherein the network client access control lists transmitted to the network clients enable the network clients to discover and communicate with portions of the trusted network that are identified by the network client access control lists.

8. The system of claim 7, wherein the access control lists for the firewalls and routers are transmitted separately from the access control lists for the network clients.

9. The system of claim 7, wherein the access control lists are used to deny communication requests.

10. The system of claim 7, wherein the trusted network is managed by an administrator group, and the administrator group is allowed to modify the access control lists for the network client over the out-of-band interface.

11. The system of claim 10, wherein the untrusted network is not managed by the administrator group.

12. The system of claim 7, wherein a shutdown operation is triggered when unauthorized configuration requests are received at the out-of-band interface.

13. A network client configured to securely communicate across a network, the network client comprising:
   a plurality of network interfaces configured to connect to a telecommunication network that comprises a trusted network and an untrusted network;
   packet filters configured to store access controls lists received over an out-of-band interface, being separate from an interface to said telecommunication network, at the network client, wherein the access controls lists enable a network client to discover and communicate with portions of the trusted network and wherein a user of the network client is denied access to the packet filters and is unable to configure the access control lists; and
   a processor configured to apply the access control lists and to drop communications without notifying a user of the network client when the access control list indicates that communication from the network client or to the network client should be denied.

14. The network client of claim 13, wherein the out-of-band interface is a PCI card management interface.

15. The network client of claim 13, wherein the trusted network includes routers, firewalls, and network clients, wherein the firewalls connect the trusted network and the untrusted network.

16. The network client of claim 13, wherein an administrator of the network management system connected to the trusted network is allowed to configure the access control list over the out-of-band interface.

17. The network client of claim 13, wherein an administrator of the network management system connected to the trusted network is limited to a number of configuration changes by the access control list.

18. The network client of claim 17, wherein the configuration changes include updates to the access control list.

19. The network client of claim 17, wherein the access control list is stored on a PCI card of the network client.

* * * * *